(12) United States Patent
Kim et al.

(10) Patent No.: US 10,544,853 B2
(45) Date of Patent: Jan. 28, 2020

(54) PLANETARY GEAR TRAIN OF AN AUTOMATIC TRANSMISSION FOR A VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Jae Joon Lee, Anyang-si (KR); Jong Sool Park, Hwaseong-si (KR); Kyeong Hun Lee, Seoul (KR); Jong Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 119 days.

(21) Appl. No.: 15/962,791

(22) Filed: Apr. 25, 2018

(65) Prior Publication Data
US 2019/0128387 A1    May 2, 2019

(30) Foreign Application Priority Data

Oct. 31, 2017    (KR) .......................... 10-2017-0143287

(51) Int. Cl.
*F16H 3/66*    (2006.01)
(52) U.S. Cl.
CPC ....... *F16H 3/66* (2013.01); *F16H 2200/0069* (2013.01); *F16H 2200/2015* (2013.01); *F16H 2200/2046* (2013.01)
(58) Field of Classification Search
CPC ............... F16H 3/66; F16H 2200/0069; F16H 2200/2015; F16H 2200/2046

USPC ......................................................... 475/276
See application file for complete search history.

(56) References Cited

U.S. PATENT DOCUMENTS

| 4,205,563 | A  | * | 6/1980  | Gorrell  | .................. | F16H 3/666 |
|---|---|---|---|---|---|---|
|  |  |  |  |  |  | 475/276 |
| 8,083,631 | B2 | * | 12/2011 | Shiohara | ................ | F16H 3/666 |
|  |  |  |  |  |  | 475/282 |
| 9,163,705 | B1 | * | 10/2015 | Hwang    | ................... | F16H 3/666 |
| 9,933,048 | B1 | * | 4/2018  | Kim      | ......................... | F16H 3/66 |
| 10,174,815 | B1 | * | 1/2019  | Kim      | ......................... | F16H 3/66 |
| 10,184,546 | B2 | * | 1/2019  | Kim      | ......................... | F16H 3/66 |

(Continued)

*Primary Examiner* — Leslie A Nicholson, III
(74) *Attorney, Agent, or Firm* — Lempia Summerfield Katz LLC

(57) ABSTRACT

A planetary gear train of an automatic transmission includes input and output shafts, first to fifth planetary gear sets respectively having first to third, fourth to sixth, seventh to ninth, tenth to twelfth, and thirteenth to fifteenth elements. The gear train has a first shaft fixedly connected with the first element and the input shaft, a second shaft fixedly connected with the ninth and thirteenth elements and the input shaft, a third shaft fixedly connected with the eighth element and the input shaft, a fourth shaft fixedly connected with the fourteenth element and the output shaft, a fifth shaft fixedly connected with the fifth, eleventh, and fifteenth elements, and a sixth shaft fixedly connected with the twelfth element. The gear train has a plurality of shafts, each of which is selectively connected to a housing and fixedly connected to an element of the first, second, third, and fourth planetary gear sets that is not fixedly connected with any of the first to sixth shafts.

11 Claims, 2 Drawing Sheets

(56) References Cited

U.S. PATENT DOCUMENTS 10,316,935 B2 * 6/2019 Kim .......................... F16H 3/62
2019/0170216 A1 * 6/2019 Kim .......................... F16H 3/66

* cited by examiner

FIG. 2

| Shift-stage | Engagement element ||||||| Gear ratio | Step ratio | Remark |
|---|---|---|---|---|---|---|---|---|---|
| | C1 | C2 | C3 | B1 | B2 | B3 | | | |
| D1 | ● | | | | ● | ● | 4.496 | - | |
| D2 | ● | | | ● | ● | | 2.890 | 1.556 | |
| D3 | ● | ● | | ● | ● | | 2.180 | 1.326 | |
| D4 | | ● | ● | | ● | | 1.740 | 1.253 | |
| D5 | | ● | ● | | ● | | 1.538 | 1.131 | |
| D6 | ● | ● | ● | | ● | | 1.213 | 1.268 | Gear ratio span : 8.2 |
| D7 | ● | ● | ● | | | | 1.000 | 1.213 | |
| D8 | ● | | ● | ● | | | 0.862 | 1.160 | |
| D9 | | ● | ● | ● | | | 0.650 | 1.326 | |
| D10 | | | ● | | | ● | 0.547 | 1.188 | Gear ratio of R/D1 : 1.0 |
| REV | | | ● | | ● | ● | -4.696 | - | |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2017-0143287 filed in the Korean Intellectual Property Office on Oct. 31, 2017, the entire contents of which are incorporated herein by reference.

BACKGROUND (a) Field of the Disclosure

The present disclosure relates to an automatic transmission for a vehicle.

(b) Description of the Related Art

Research into realizing more shift-stages of an automatic transmission has been undertaken to achieve enhancement of fuel consumption and better drivability. Increased oil prices have triggering fierce competition to enhance or reduce fuel consumption for vehicles.

Therefore, research in the field of engines has been undertaken to achieve weight reduction and to enhance or reduce fuel consumption by so-called downsizing. Research in the field of automatic transmissions has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Recently, an eight-speed automatic transmission has been introduced. Planetary gear trains for automatic transmissions enabling more shift stages are under investigation.

A conventional automatic transmission of eight or more shift-stages typically includes three to four planetary gear sets and five to seven engagement elements (frictional elements). Such a transmission may easily become lengthy, thereby deteriorating installability.

In this regard, solutions such as disposing planetary gear sets in parallel or employing dog clutches instead of wet-type control elements have been attempted. However, such arrangements may not be widely applicable. Further, using dog clutches may easily deteriorate shift-feel.

The above information disclosed in this Background section is only to enhance understanding of the background of the disclosure. Therefore, the Background section may contain information that does not form the prior art that is already known in this country to a person of ordinary skill in the art.

SUMMARY

The present disclosure relates to a planetary gear train of an automatic transmission for a vehicle enabling at least ten forward speeds, thereby providing better performance and fuel efficiency of a vehicle.

A planetary gear train of an automatic transmission for a vehicle may include: an input shaft for receiving an input torque; an output shaft for outputting a shifted torque; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; and a fifth planetary gear set having thirteenth, fourteenth, and fifteenth rotation elements. The planetary gear train may also include: a first shaft fixedly connected with the first rotation element and fixedly connected with the input shaft; a second shaft fixedly connected with the ninth rotation element and the thirteenth rotation element and fixedly connected with the input shaft; a third shaft fixedly connected with the eighth rotation element and fixedly connected with the input shaft; a fourth shaft fixedly connected with the fourteenth rotation element and fixedly connected with the output shaft; a fifth shaft fixedly connected with the fifth rotation element, the eleventh rotation element, and the fifteenth rotation element; a sixth shaft fixedly connected with the twelfth rotation element; and a plurality of shafts, each of which is selectively connected to the transmission housing and fixedly connected to a rotation element of the first, second, third, and fourth planetary gear sets that is not fixedly connected with any of the first to sixth shafts.

The plurality of shafts may include: a seventh shaft fixedly connected with the third rotation element and the fourth rotation element and the seventh rotation element and selectively connected with the transmission housing; an eighth shaft fixedly connected with the sixth rotation element and the tenth rotation element and selectively connected with the transmission housing; and a ninth shaft fixedly connected with the second rotation element and selectively connected with the transmission housing. The input shaft and the second shaft, the input shaft and the third shaft, and the second shaft and the sixth shaft may be selectively connected with each other, respectively.

The planetary gear train may further include three clutches, each selectively connecting a corresponding pair among the input shaft, the output shaft, and the first to ninth shafts. The planetary gear train may further include three brakes selectively connecting the seventh shaft, the eighth shaft, and the ninth shaft to the transmission housing, respectively.

The three clutches may include a first clutch arranged between the input shaft and the second shaft, a second clutch arranged between the input shaft and the third shaft, and a third clutch arranged between the second shaft and the sixth shaft. The three brakes may include a first brake arranged between the seventh shaft and the transmission housing, a second brake arranged between the eighth shaft and the transmission housing, and a third brake arranged between the ninth shaft and the transmission housing.

The first planetary gear set may be a single pinion planetary gear set having a first sun gear, a first planet carrier, and a first ring gear as the first, second, and third rotation elements, respectively. The second planetary gear set may be a single pinion planetary gear set having a second sun gear, a second planet carrier, and a second ring gear as the fourth, fifth, and sixth rotation elements, respectively. The third planetary gear set may be a single pinion planetary gear set having a third sun gear, a third planet carrier, and a third ring gear as the seventh, eighth, and ninth rotation elements, respectively. The fourth planetary gear set may be a single pinion planetary gear set having a fourth sun gear, a fourth planet carrier, and a fourth ring gear as the tenth, eleventh, and twelfth rotation elements, respectively. The fifth planetary gear set may be a single pinion planetary gear set having a fifth sun gear, a fifth planet carrier, and a fifth ring gear as the thirteenth, fourteenth, and fifteenth rotation elements, respectively.

The first, second, third, fourth, and fifth planetary gear sets may be arranged in the order of the first, second, fourth, third, and fifth planetary gear sets from an input side.

A planetary gear train according to an embodiment of the present disclosure may realize ten forward speeds and one reverse speed by operating five planetary gear sets by controlling six engagement elements.

A planetary gear train according to an embodiment of the present disclosure realizes shifting by controlling five planetary gear sets by six engagement elements, achieves uniform torque load over clutches and brakes, and minimizes torque load applied respective shafts connection rotation elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios are achieved, thereby enhancing linearity of step ratios.

In addition, a gear ratio span may be increased to above 8.0 while realizing ten forward speeds and one reverse speed. Power performance and fuel economy may be also maximized.

In addition, a planetary gear train according to an embodiment of the present disclosure may substantially improve driving stability by realizing shift-stages appropriate for rotation speed of an engine due to the multi-stages of an automatic transmission.

Further, effects that can be obtained or expected from embodiments of the present disclosure are directly or suggestively described in the following detailed description. In other words, various effects expected from embodiments of the present disclosure are described in the following detailed description.

BRIEF DESCRIPTION OF THE DRAWINGS

FIG. 2 is an operational chart for respective control elements at respective shift-stages applicable to a planetary gear train according to an embodiment of the present disclosure.

DETAILED DESCRIPTION OF THE EMBODIMENTS

Figure 1:
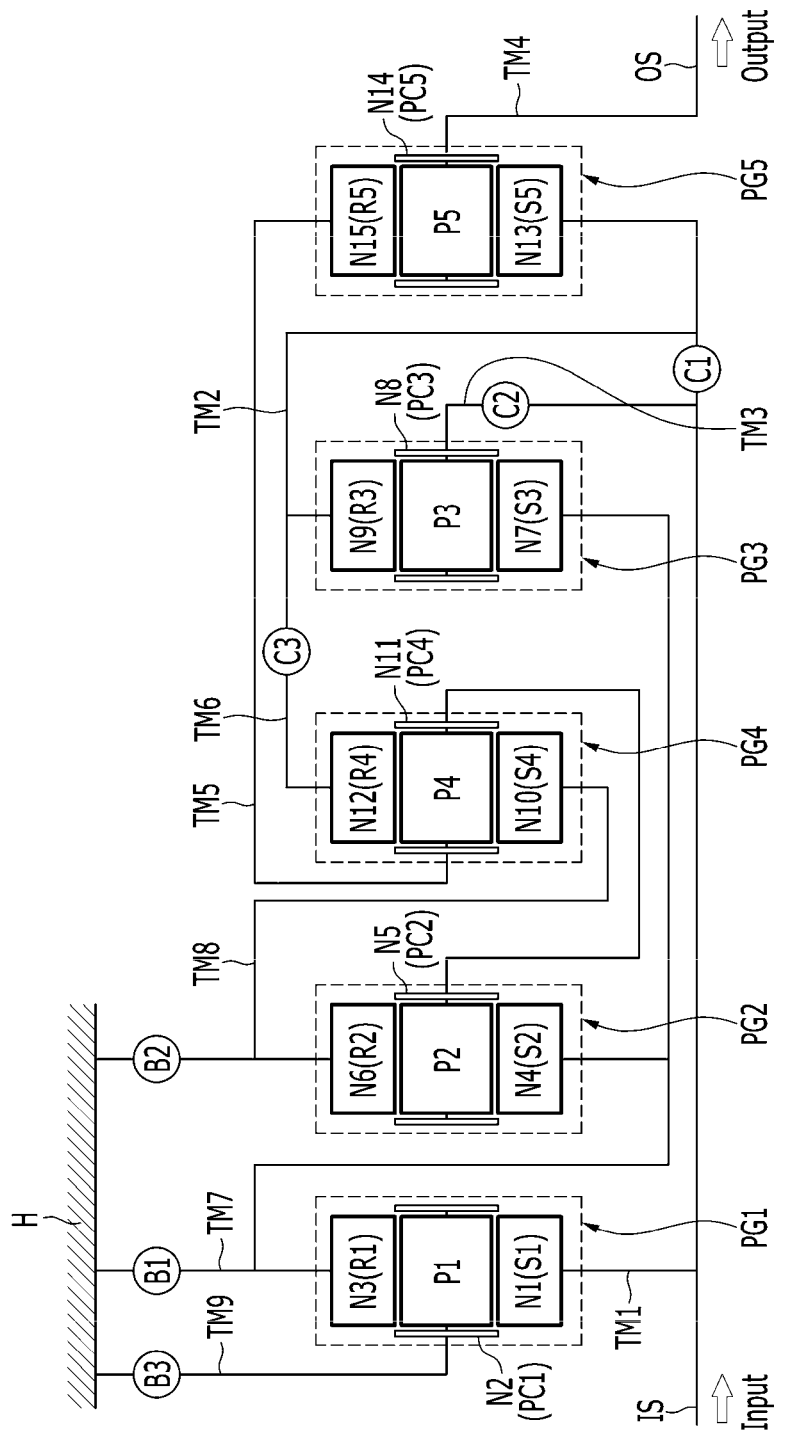
FIG. 1 is a schematic diagram of a planetary gear train according to an embodiment of the present disclosure.

In order to maximally enhance fuel consumption of an automatic transmission having more shift stages, it is important for better efficiency that the automatic transmission be derived of a smaller number of parts. In this aspect, the present disclosure relates to a planetary gear train of an automatic transmission for a vehicle which may utilize fewer parts while achieving the above goals.

Hereinafter, an embodiment of the present disclosure is described in detail with reference to the drawings. In the drawings, the following symbols are used to identify various elements of the disclosed embodiments, wherein:

B1, B2, B3: first, second, and third brakes
C1, C2, C3: first, second, and third clutches
PG1, PG2, PG3, PG4, PG5: first, second, third, fourth, and fifth planetary gear sets
S1, S2, S3, S4, S5: first, second, third, fourth, and fifth sun gears
PC1, PC2, PC3, PC4, PC5: first, second, third, fourth, and fifth planet carriers
R1, R2, R3, R4, R5: first, second, third, fourth, and fifth ring gears
IS: input shaft
OS: output shaft
TM1, TM2, TM3, TM4, TM5, TM6, TM7, TM8, TM9: first, second, third, fourth, fifth, sixth, seventh, eighth, and ninth shafts The drawings and description are to be regarded as illustrative in nature and not restrictive. Like reference numerals designate like elements throughout the specification.

In the following description, using names or terms to identify components such as first, second, third, and the like is to differentiate the names because the names of the components are otherwise the same as each other. Such naming conventions are not intended to denote or set an order thereof, and the disclosure is not intended to be so limited.

FIG. 1 is a schematic diagram of a planetary gear train according to an embodiment of the present disclosure.

Referring to FIG. 1, a planetary gear train according to an embodiment of the present disclosure includes first, second, third, fourth, and fifth planetary gear sets PG1, PG2, PG3, PG4, and PG5 arranged on a same axis. The planetary gear train also includes an input shaft IS, an output shaft OS, nine shafts TM1-TM9 interconnecting rotation elements of the first, second, third, fourth, and fifth planetary gear sets PG1, PG2, PG3, PG4, and PG5, engagement elements of three clutches C1-C3 and three brakes B1-B3, and a transmission housing H.

Torque input from the input shaft IS is shifted by cooperative operation of the first, second, third, fourth, and fifth planetary gear sets PG1, PG2, PG3, PG4, and PG5, and is output through the output shaft OS.

In this embodiment of the present disclosure, the planetary gear sets are arranged in the order of the first, second, fourth, third, and fifth planetary gear set PG1, PG2, PG4, PG3, and PG5, from an engine side.

The input shaft IS is an input member and may receive a torque from a crankshaft of an engine through a torque converter.

The output shaft OS is an output member arranged on a same axis with the input shaft IS. The output shaft OS outputs a shifted driving torque to a driveshaft through a differential apparatus.

In this embodiment, the first planetary gear set PG1 is a single pinion planetary gear set. The first planetary gear set includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

In this embodiment, the second planetary gear set PG2 is a single pinion planetary gear set. The second planetary gear set includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

In this embodiment, the third planetary gear set PG3 is a single pinion planetary gear set. The third planetary gear set includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

In this embodiment, the fourth planetary gear set PG4 is a single pinion planetary gear set. The fourth planetary gear set includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear acts as a tenth rotation element N10, the fourth planet carrier PC4 acts as an eleventh rotation element N11, and the fourth ring gear R4 acts as a twelfth rotation element N12.

In this embodiment, the fifth planetary gear set PG5 is a single pinion planetary gear set. The fifth planetary gear set includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotation element N13, the fifth planet carrier PC5 acts as a fourteenth rotation element N14, and the fifth ring gear R5 acts as a fifteenth rotation element N15.

In the arrangement of the first, second, third, fourth, and fifth planetary gear sets PG1, PG2, PG3, PG4, and PG5, the third rotation element N3 is fixedly connected with the fourth rotation element N4 and the seventh rotation element N7, the fifth rotation element N5 is fixedly connected with the eleventh rotation element N11 and the fifteenth rotation element N15, and the ninth rotation element N9 is fixedly connected with the thirteenth rotation element N13, thereby forming nine shafts TM1-TM9.

The nine shafts TM1 to TM9 are hereinafter described in detail.

In this embodiment, the first shaft TM1 is fixedly connected with the first rotation element N1 (first sun gear S1), and fixedly connected with the input shaft IS, thereby always acting as an input element.

The second shaft TM2 is fixedly connected with the ninth rotation element N9 (third ring gear R3) and the thirteenth rotation element N13 (fifth sun gear S5), and selectively connected with the input shaft IS thereby selectively acting as an input element.

The third shaft TM3 is fixedly connected with the eighth rotation element N8 (third planet carrier PC3), and selectively connected with the input shaft IS thereby selectively acting as an input element.

The fourth shaft TM4 is fixedly connected with the fourteenth rotation element N14 (fifth planet carrier PC5), and fixedly connected with the output shaft OS thereby always acting as an output element.

The fifth shaft TM5 is fixedly connected with the fifth rotation element N5 (second planet carrier PC2), the eleventh rotation element N11 (fourth planet carrier PC4), and the fifteenth rotation element N15 (fifth ring gear R5).

The sixth shaft TM6 is fixedly connected with the twelfth rotation element N12 (fourth ring gear R4).

The seventh shaft TM7 is fixedly connected with the third rotation element N3 (first ring gear R1), the fourth rotation element N4 (second sun gear S2), and the seventh rotation element N7 (third sun gear S3).

The eighth shaft TM8 is fixedly connected with sixth rotation element N6 (second ring gear R2) and tenth rotation element N10 (fourth sun gear S4).

The ninth shaft TM9 is fixedly connected with the second rotation element N2 (first planet carrier PC1).

Each of the nine shafts TM1-TM9 may be a rotational member that fixedly interconnects the input and output shafts and the rotation elements of the planetary gear sets PG1, PG2, PG3, and PG4. Each of the nine shafts TM1-TM9 may be a rotational member that selectively interconnects a rotation element to the transmission housing H. Each of the nine shafts TM1-TM9 may be a fixed member fixed to the transmission housing H.

In the disclosure, the fixedly connected members always rotate at the same speed when two or more members are described to be "fixedly connected", where each of the members may be any of a shaft, an input shaft, an output shaft, a rotational member, and a transmission housing.

When two or more members are described to be "selectively connected" by an engagement element, the selectively connected members rotate separately when the engagement element is not engaged and rotate at a same speed when the engagement element is engaged. It may be understood that in the case that a member is "selectively connected" with a transmission housing by an engagement element, the member may be stationary when the engagement element is engaged.

In this embodiment, the first shaft TM1 is fixedly connected with the input shaft IS, the second shaft TM2 and the third shaft TM3 are selectively connected with the input shaft IS, and the second shaft TM2 is selectively connected with the sixth shaft TM6.

The seventh shaft TM7, the eighth shaft TM8, and the ninth shaft TM9 are selectively connected with the transmission housing H, thereby selectively acting as a fixed element, respectively.

The engagement elements of three clutches C1, C2, and C3 are arranged between the nine shafts TM1-TM9, the input shaft IS, and the output shaft OS, thereby forming selective connections.

The nine shafts TM1-TM9 may be selectively connected with the transmission housing H by control elements of three brakes B1, B2, and B3.

In this embodiment, the six engagement elements of the three clutches C1-C3 and the three brakes B1-B3 are arranged as follows.

The first clutch C1 is arranged between the input shaft IS and the second shaft TM2, and selectively connects the input shaft IS and the second shaft TM2, thereby controlling power delivery therebetween.

The second clutch C2 is arranged between the input shaft IS and the third shaft TM3, and selectively connects the input shaft IS and the third shaft TM3, thereby controlling power delivery therebetween.

The third clutch C3 is arranged between the second shaft TM2 and the sixth shaft TM6, and selectively connects the second shaft TM2 and the sixth shaft TM6, thereby controlling power delivery therebetween.

The first brake B1 is arranged between the seventh shaft TM7 and the transmission housing H, and selectively connects the seventh shaft TM7 to the transmission housing H.

The second brake B2 is arranged between the eighth shaft TM8 and the transmission housing H, and selectively connects the eighth shaft TM8 to the transmission housing H.

The third brake B3 is arranged between the ninth shaft TM9 and the transmission housing H, and selectively connects the ninth shaft TM9 to the transmission housing H.

In this embodiment, the engagement elements of the first, second, and third clutches C1, C2, and C3 and the first, second, and third brakes B1, B2, and B3 may be realized as multi-plate hydraulic pressure friction devices that are frictionally engaged by hydraulic pressure. However, it should not be understood to be limited thereto, since various other configurations that are electrically controllable may be available.

FIG. 2 is an operational chart for the respective control elements at respective shift-stages applicable to a planetary gear train according to an embodiment of the present disclosure.

Referring to FIG. 2, a planetary gear train according to an embodiment of the present disclosure realizes shifting between ten forward speeds and one reverse speed by operating three elements among the engagement elements of the first, second, and third clutches C1, C2, and C3 and the first, second, and third brakes B1, B2, and B3.

In this embodiment, the first clutch C1 and the second and third brakes B2 and B3 are simultaneously operated in the forward first speed D1.

As a result, the first shaft TM1 always receives an input torque by being fixedly connected with the input shaft IS, and the second shaft TM2 is connected with the input shaft IS by the operation of the first clutch C1. Thereby, the input torque is simultaneously input to the second shaft TM2.

In addition, the eighth and ninth shafts TM8 and TM9 respectively act as fixed elements by the operation of the second and third brakes B2 and B3, thereby realizing the forward first speed D1 and outputting a shifted torque to the output shaft OS connected with the fourth shaft TM4.

In this embodiment, the first clutch C1 and the first and second brakes B1 and B2 are simultaneously operated in the forward second speed D2.

As a result, the first shaft TM1 always receives an input torque by being fixedly connected with the input shaft IS, and the second shaft TM2 is connected with the input shaft IS by the operation of the first clutch C1. Thereby, the input torque is simultaneously input to the second shaft TM2.

In addition, the seventh and eighth shafts TM7 and TM8 act as fixed elements by the operation of the first and second brakes B1 and B2, thereby realizing the forward second speed D2 and outputting a shifted torque to the output shaft OS connected with the fourth shaft TM4.

In this embodiment, the second clutch C2 and the first and second brakes B1 and B2 are simultaneously operated in the forward third speed D3.

As a result, the first shaft TM1 always receives an input torque by being fixedly connected with the input shaft IS, and the third shaft TM3 is connected with the input shaft IS by the operation of the second clutch C2. Thereby, the input torque is simultaneously input to the third shaft TM3.

In addition, the seventh and eighth shafts TM7 and TM8 act as fixed elements by the operation of the first and second brakes B1 and B2, thereby realizing the forward third speed D3 and outputting a shifted torque to the output shaft OS connected with the fourth shaft TM4.

In this embodiment, the first and second clutch C1 and C2 and the second brake B2 are simultaneously operated in the forward fourth speed D4.

As a result, the first shaft TM1 always receives an input torque by being fixedly connected with the input shaft IS, and the second shaft TM2 and the third shaft TM3 is connected with the input shaft IS by the operation of the first clutch C1 and the second clutch C2. Thereby, the input torque is simultaneously input to the second shaft TM2 and the third shaft TM3.

In addition, the eighth shaft TM8 acts as a fixed element by the operation of the second brake B2, thereby realizing the forward fourth speed D4 and outputting a shifted torque to the output shaft OS connected with the fourth shaft TM4.

In this embodiment, the second and third clutches C2 and C3 and the second brake B2 are simultaneously operated in the forward fifth speed D5.

As a result, the first shaft TM1 always receives an input torque by being fixedly connected with the input shaft IS, and the third shaft TM3 is connected with the input shaft IS by the operation of the second clutch C2. Thereby, the input torque is simultaneously input to the third shaft TM3, and simultaneously, the second shaft TM2 is connected with the sixth shaft TM6 by the operation of the third clutch C3.

In addition, the eighth shaft TM8 acts as a fixed element by the operation of the second brake B2, thereby realizing the forward fifth speed D5 and outputting a shifted torque to the output shaft OS connected with the fourth shaft TM4.

In this embodiment, the first and third clutches C1 and C3 and the second brake B2 are simultaneously operated in the forward sixth speed D6.

As a result, the first shaft TM1 always receives an input torque by being fixedly connected with the input shaft IS, and the second shaft TM2 is connected with the input shaft IS by the operation of the first clutch C1. Thereby, the input torque is simultaneously input to the second shaft TM2, and simultaneously, the second shaft TM2 is connected with the sixth shaft TM6 by the operation of the third clutch C3.

In addition, the eighth shaft TM8 acts as a fixed element by the operation of the second brake B2, thereby realizing the forward sixth speed D6 and outputting a shifted torque to the output shaft OS connected with the fourth shaft TM4.

In this embodiment, the first, second, and third clutches C1, C2, and C3 are simultaneously operated in the forward seventh speed D7.

As a result, the first shaft TM1 always receives an input torque by being fixedly connected with the input shaft IS, the second shaft TM2 is connected with the input shaft IS by the operation of the first clutch C1, the third shaft TM3 is connected with the input shaft IS by the operation of the second clutch C2, and the second shaft TM2 is connected with the sixth shaft TM6 by the operation of the third clutch C3.

The first, second, third, fourth, and fifth planetary gear sets PG1, PG2, PG3, PG4, and PG5 then integrally rotate. The input torque is input to the first shaft TM1, the second shaft TM2, and the third shaft TM3, thereby realizing the seventh speed D7 where a torque is output as inputted and outputting a shifted torque to the output shaft OS connected with the fourth shaft TM4.

In this embodiment, the first and third clutches C1 and C3 and the first brake B1 are simultaneously operated in the forward eighth speed D8.

As a result, the first shaft TM1 always receives an input torque by being fixedly connected with the input shaft IS, and the second shaft TM2 is connected with the input shaft IS by the operation of the first clutch C1. Thereby, the input torque is simultaneously input to the second shaft TM2, and simultaneously, the second shaft TM2 is connected with the sixth shaft TM6 by the operation of the third clutch C3.

In addition, the seventh shaft TM7 acts as a fixed element by the operation of the first brake B1, thereby realizing the forward eighth speed D8 and outputting a shifted torque to the output shaft OS connected with the fourth shaft TM4.

In this embodiment, the second and third clutches C2 and C3 and the first brake B1 are simultaneously operated in the forward ninth speed D9.

As a result, the first shaft TM1 always receives an input torque by being fixedly connected with the input shaft IS, and the third shaft TM3 is connected with the input shaft IS by the operation of the second clutch C2. Thereby, the input torque is simultaneously input to the third shaft TM3, and simultaneously, the second shaft TM2 is connected with the sixth shaft TM6 by the operation of the third clutch C3.

In addition, the seventh shaft TM7 acts as a fixed element by the operation of the first brake B1, thereby realizing the forward ninth speed D9 and outputting a shifted torque to the output shaft OS connected with the fourth shaft TM4.

In this embodiment, the second and third clutches C2 and C3 and the first brake B1 are simultaneously operated in the forward tenth speed D10.

As a result, the first shaft TM1 always receives an input torque by being fixedly connected with the input shaft IS, and the third shaft TM3 is connected with the input shaft IS by the operation of the second clutch C2. Thereby, the input torque is simultaneously input to the third shaft TM3, and simultaneously, the second shaft TM2 is connected with the sixth shaft TM6 by the operation of the third clutch C3.

In addition, the ninth shaft TM9 acts as a fixed element by the operation of the third brake B3, thereby realizing the forward tenth speed D10 and outputting a shifted torque to the output shaft OS connected with the fourth shaft TM4.

In this embodiment, the third clutch C3 and the second and third brakes B2 and B3 are simultaneously operated in the reverse speed REV.

As a result, the first shaft TM1 always receives an input torque by being fixedly connected with the input shaft IS, and the second shaft TM2 is connected with the sixth shaft TM6 by the operation of the third clutch C3.

In addition, the eighth and ninth shafts TM8 and TM9 respectively act as fixed elements by the operation of the second and third brakes B2 and B3, thereby realizing the reverse speed REV and outputting a shifted torque to the output shaft OS connected with the fourth shaft TM4.

As described above, a planetary gear train according to an embodiment of the present disclosure may realize ten forward speeds and one reverse speed by operating five planetary gear sets PG1, PG2, PG3, PG4, and PG5 by controlling three clutches C1, C2, and C3 and three brakes B1, B2, and B3.

A planetary gear train according to an embodiment of the present disclosure realizes shifting by controlling five planetary gear sets PG1, PG2, PG3, PG4, and PG5 by six engagement elements C1, C2, C3, B1, B2, and B3, achieves uniform torque load over clutches and brakes, and minimizes torque load applied respective shafts connection rotation elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios, thereby enhancing linearity of step ratios.

In addition, a gear ratio span may be increased to above 8.0 while realizing ten forward speeds and one reverse speed, and power performance and fuel economy may be maximized.

In addition, a large number of shift-stages are realized, and an engine speed may be maintained at a low speed by enabling an optimal shift-stage, thereby improving noise, vibration, and harshness (N.V.H.) characteristics of a vehicle.

While this invention has been described in connection with what are presently considered to be practical embodiments, it is to be understood that the disclosure is not limited to the disclosed embodiments. On the contrary, the disclosure intended to cover various modifications and equivalent arrangements included within the spirit and scope of the appended claims.

What is claimed is:

1. A planetary gear train of an automatic transmission for a vehicle, comprising:
    an input shaft for receiving an input torque;
    an output shaft for outputting a shifted torque;
    a first planetary gear set having a first, a second, and a third rotation element;
    a second planetary gear set having a fourth, a fifth, and a sixth rotation element;
    a third planetary gear set having a seventh, an eighth, and a ninth rotation element;
    a fourth planetary gear set having a tenth, an eleventh, and a twelfth rotation element;
    a fifth planetary gear set having a thirteenth, a fourteenth, and a fifteenth rotation element;
    a first shaft fixedly connected with the first rotation element and fixedly connected with the input shaft;
    a second shaft fixedly connected with the ninth rotation element and the thirteenth rotation element and selectively connected with the input shaft;
    a third shaft fixedly connected with the eighth rotation element and selectively connected with the input shaft;
    a fourth shaft fixedly connected with the fourteenth rotation element and fixedly connected with the output shaft;
    a fifth shaft fixedly connected with the fifth rotation element, the eleventh rotation element, and the fifteenth rotation element;
    a sixth shaft fixedly connected with the twelfth rotation element; and
    a plurality of shafts, each of which is selectively connected to a transmission housing and fixedly connected to a rotation element of the first, second, third, and fourth planetary gear sets that is not fixedly connected with any of the first to sixth shafts.

2. The planetary gear train of claim 1, wherein the plurality of shafts comprises:
    a seventh shaft fixedly connected with the third rotation element, the fourth rotation element, and the seventh rotation element and selectively connected with the transmission housing;
    an eighth shaft fixedly connected with the sixth rotation element and the tenth rotation element and selectively connected with the transmission housing; and
    a ninth shaft fixedly connected with the second rotation element and selectively connected with the transmission housing,
    wherein the input shaft and the second shaft, the input shaft and the third shaft, and the second shaft and the sixth shaft are selectively connected with each other, respectively.

3. The planetary gear train of claim 2, further comprising:
    three clutches each selectively connecting a corresponding pair among the input shaft, the output shaft, and the first to ninth shafts; and
    three brakes selectively connecting the seventh shaft, the eighth shaft, and the ninth shaft to the transmission housing, respectively.

4. The planetary gear train of claim 3, wherein the three clutches comprise:
    a first clutch arranged between the input shaft and the second shaft;

a second clutch arranged between the input shaft and the third shaft; and a third clutch arranged between the second shaft and the sixth shaft, and wherein the three brakes comprise:

a first brake arranged between the seventh shaft and the transmission housing;

a second brake arranged between the eighth shaft and the transmission housing; and a third brake arranged between the ninth shaft and the transmission housing.

5. The planetary gear train of claim 1, wherein:

the first planetary gear set is a single pinion planetary gear set having a first sun gear, a first planet carrier, and a first ring gear as the first, second, and third rotation elements, respectively;

the second planetary gear set is a single pinion planetary gear set having a second sun gear, a second planet carrier, and a second ring gear as the fourth, fifth, and sixth rotation elements, respectively;

the third planetary gear set is a single pinion planetary gear set having a third sun gear, a third planet carrier, and a third ring gear as the seventh, eighth, and ninth rotation elements, respectively;

the fourth planetary gear set is a single pinion planetary gear set having a fourth sun gear, a fourth planet carrier, and a fourth ring gear as the tenth, eleventh, and twelfth rotation elements, respectively; and the fifth planetary gear set is a single pinion planetary gear set having a fifth sun gear, a fifth planet carrier, and a fifth ring gear as the thirteenth, fourteenth, and fifteenth rotation elements, respectively.

6. The planetary gear train of claim 1, wherein the first, second, third, fourth, and fifth planetary gear sets are arranged in the order of the first, second, fourth, third, and fifth planetary gear sets from an input side.

7. A planetary gear train of an automatic transmission for a vehicle, comprising:

an input shaft for receiving an input torque;

an output shaft for outputting a shifted torque;

a first planetary gear set having a first, a second, and a third rotation element;

a second planetary gear set having a fourth, a fifth, and a sixth rotation element;

a third planetary gear set having a seventh, an eighth, and a ninth rotation element;

a fourth planetary gear set having a tenth, an eleventh, and a twelfth rotation element;

a fifth planetary gear set having a thirteenth, a fourteenth, and a fifteenth rotation element, wherein the first rotation element is fixedly connected with the input shaft, the second rotation element is selectively connected with a transmission housing, the third rotation element is fixedly connected with the fourth rotation element and the seventh rotation element, and selectively connected with the transmission housing, the fifth rotation element is fixedly connected with the eleventh rotation element and the fifteenth rotation element, the sixth rotation element is fixedly connected with the tenth rotation element, and selectively connected with the transmission housing, the eighth rotation element is selectively connected with the input shaft, the ninth rotation element is fixedly connected with the thirteenth rotation element, and selectively connected with the input shaft and the twelfth rotation element respectively, and the fourteenth rotation element is fixedly connected with the output shaft.

8. The planetary gear train of claim 7, further comprising:

three clutches each selectively connecting a corresponding pair of the input shaft and rotation elements; and three brakes selectively connecting the second rotation element, the third rotation element, and the sixth rotation element to the transmission housing.

9. The planetary gear train of claim 8, wherein the three clutches comprise:

a first clutch arranged between the input shaft and the ninth rotation element;

a second clutch arranged between the input shaft and the eighth rotation element; and a third clutch arranged between the ninth rotation element and the twelfth rotation element, and wherein the three brakes comprise:

a first brake arranged between the third rotation element and the transmission housing;

a second brake arranged between the sixth rotation element and the transmission housing; and a third brake arranged between the second rotation element and the transmission housing.

10. The planetary gear train of claim 7, wherein:

the first planetary gear set is a single pinion planetary gear set having a first sun gear, a first planet carrier, and a first ring gear as the first, second, and third rotation elements, respectively;

the second planetary gear set is a single pinion planetary gear set having a second sun gear, a second planet carrier, and a second ring gear as the fourth, fifth, and sixth rotation elements, respectively;

the third planetary gear set is a single pinion planetary gear set having a third sun gear, a third planet carrier, and a third ring gear as the seventh, eighth, and ninth rotation elements, respectively;

the fourth planetary gear set is a single pinion planetary gear set having a fourth sun gear, a fourth planet carrier, and a fourth ring gear as the tenth, eleventh, and twelfth rotation elements, respectively; and the fifth planetary gear set is a single pinion planetary gear set having a fifth sun gear, a fifth planet carrier, and a fifth ring gear as the thirteenth, fourteenth, and fifteenth rotation elements, respectively.

11. The planetary gear train of claim 7, wherein the first, second, third, fourth, and fifth planetary gear sets are arranged in the order of the first, second, fourth, third, and fifth planetary gear sets from an input side.

* * * * *